(12) United States Patent
Lee et al.

(10) Patent No.: US 10,907,287 B2
(45) Date of Patent: Feb. 2, 2021

(54) WASHING MACHINE AND METHOD OF CONTROLLING THE SAME

(71) Applicant: LG ELECTRONICS INC., Seoul (KR)

(72) Inventors: Hoonbong Lee, Seoul (KR); Minho Jang, Seoul (KR); Jaegwang Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 192 days.

(21) Appl. No.: 15/718,315

(22) Filed: Sep. 28, 2017

(65) Prior Publication Data

US 2018/0087199 A1    Mar. 29, 2018

(30) Foreign Application Priority Data

Sep. 29, 2016   (KR) .................. 10-2016-0125761

(51) Int. Cl.
*D06F 33/00*    (2020.01)
*D06F 34/18*    (2020.01)
(Continued)

(52) U.S. Cl.
CPC .............. *D06F 33/00* (2013.01); *D06F 23/02* (2013.01); *D06F 34/18* (2020.02); *D06F 34/28* (2020.02);
(Continued)

(58) Field of Classification Search
CPC ........ D06F 39/003; D06F 34/18; D06F 33/00; D06F 35/00
See application file for complete search history.

(56) References Cited

U.S. PATENT DOCUMENTS 9,745,685 B2   8/2017 Jang et al.
2005/0028296 A1   2/2005 Lee et al.
(Continued)

FOREIGN PATENT DOCUMENTS

DE   198 57 903   6/1999
EP   1 995 366   11/2008
(Continued)

OTHER PUBLICATIONS

European Search Report dated Jan. 30, 2018 issued in Application No. 17193776.6.
(Continued)

*Primary Examiner* — Spencer E Bell
(74) *Attorney, Agent, or Firm* — KED & Associates, LLP

(57) ABSTRACT

An amount of laundry that is introduced into a washing machine is calculated using gravity and inertia applied during the operation of a motor, whereby the amount of laundry is precisely measured and effects of the initial position of the laundry and the movement of the laundry are minimized. In addition, a measured current of the operated motor is used to determine the amount of laundry without a sensor. Furthermore, the rotational speed of the motor is controlled stepwise from a low speed to eliminate variation due to vibration. Moreover, the characteristics of gravity in the low-speed maintenance period are used to effectively calculate the amount of laundry, and the characteristics of inertia in the acceleration period are also used, whereby it is possible to precisely determine the amount of laundry. Consequently, it is easy to commence the spin-drying operation, thereby reducing washing time and saving energy.

11 Claims, 9 Drawing Sheets

(51) Int. Cl.
*D06F 23/02* (2006.01)
*D06F 37/22* (2006.01)
*D06F 37/30* (2020.01)
*D06F 34/28* (2020.01)
*D06F 37/06* (2006.01)
*D06F 37/26* (2006.01)
*D06F 37/38* (2006.01)
*D06F 39/00* (2020.01)
*D06F 39/02* (2006.01)
*D06F 39/04* (2006.01)
*D06F 39/08* (2006.01)
*D06F 39/14* (2006.01)

(52) U.S. Cl.
CPC .............. *D06F 37/06* (2013.01); *D06F 37/22* (2013.01); *D06F 37/266* (2013.01); *D06F 37/304* (2013.01); *D06F 37/38* (2013.01); *D06F 39/008* (2013.01); *D06F 39/02* (2013.01); *D06F 39/045* (2013.01); *D06F 39/085* (2013.01); *D06F 39/087* (2013.01); *D06F 39/088* (2013.01); *D06F 39/14* (2013.01); *D06F 2202/04* (2013.01); *D06F 2202/065* (2013.01); *D06F 2202/085* (2013.01); *D06F 2202/10* (2013.01); *D06F 2202/12* (2013.01); *D06F 2204/065* (2013.01); *D06F 2204/088* (2013.01); *D06F 2222/00* (2013.01)

(56) References Cited

U.S. PATENT DOCUMENTS

| | | |
|---|---|---|
| 2005/0028299 A1 | 2/2005 | Jeon et al. |
| 2012/0005840 A1 | 1/2012 | Jang et al. |
| 2012/0324654 A1 | 12/2012 | Koo et al. |
| 2014/0101865 A1 | 4/2014 | Jang et al. |
| 2015/0051738 A1 | 2/2015 | Lee et al. |

FOREIGN PATENT DOCUMENTS

| | | |
|---|---|---|
| EP | 2 354 296 | 8/2011 |
| EP | 02719813 | 4/2014 |
| EP | 2 837 732 | 2/2015 |
| KR | 10-2011-0048352 | 5/2011 |
| KR | 10-2012-0004272 | 1/2012 |
| KR | 10-1156710 | 6/2012 |
| KR | 10-2014-0045714 | 4/2014 |
| KR | 10-2015-0019649 | 2/2015 |
| WO | WO 2005/085511 | 9/2005 |
| WO | WO 2011/078611 | 6/2011 |

OTHER PUBLICATIONS

International Search Report (with English Translation) dated Jan. 19, 2018 issued in Application No. PCT/KR2017/010676.
European Search Report dated Feb. 26, 2018 issued in European Application No. 17193132.2.
European Search Report dated Feb. 26, 2018 issued in European Application No. 17193773.3.
United States Office Action dated Oct. 18, 2019 issued in U.S. Appl. No. 15/715,517.
United States Office Action dated Mar. 24, 2020 issued in U.S. Appl. No. 15/715,517.

FIG. 4
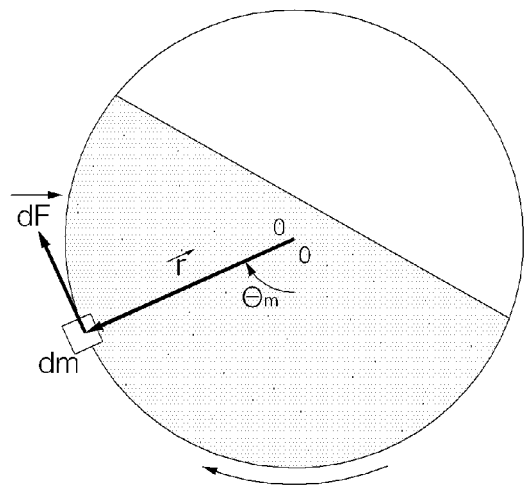
(a)
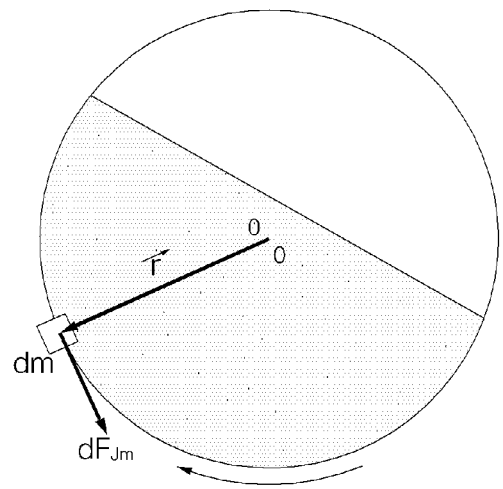
(b)
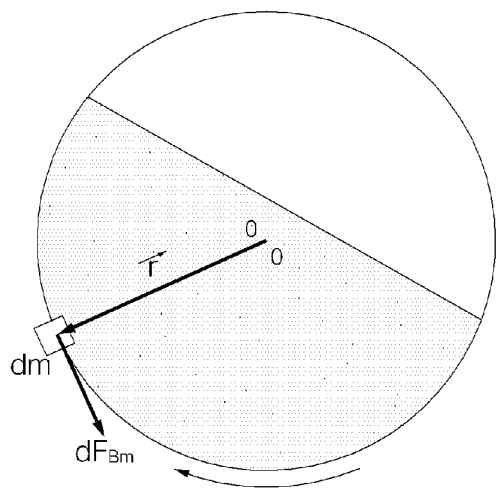
(c)
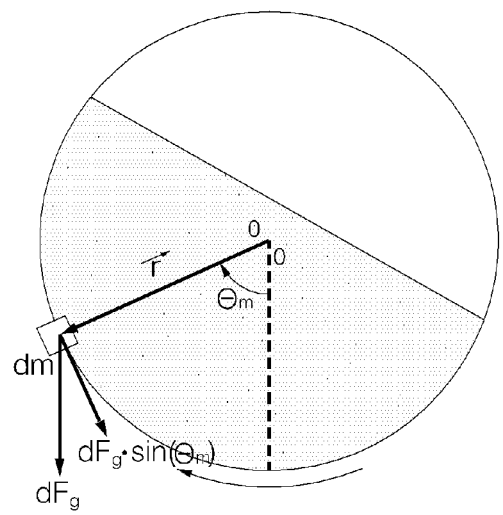
(d)

WASHING MACHINE AND METHOD OF CONTROLLING THE SAME

CROSS-REFERENCE TO RELATED APPLICATION

This application claims priority under 35 U.S.C. § 119 to Korean Application No. 10-2016-0125761, filed on Sep. 29, 2016, whose entire disclosure is hereby incorporated by reference.

BACKGROUND

1. Field

The present disclosure relates to a washing machine and a method of controlling the same, and more particularly to a washing machine capable of sensing the amount of laundry that is introduced thereinto and a method of controlling the same.

2. Background

In general, a washing machine is an apparatus that treats laundry through various processes, such as washing, spin drying, and/or drying. A predetermined amount of wash water is supplied into a drum containing laundry therein. An appropriate amount of detergent is dissolved in the wash water to remove contaminants from the laundry through the chemical action of the detergent. In addition, the drum, in which the laundry is contained, is rotated to easily remove contaminants from the laundry through the mechanical friction between the wash water and the laundry and vibration of the laundry.

In order to remove contaminants from the laundry, a washing cycle, a rinsing cycle, and a spin-drying cycle are performed. During washing of the laundry, a spin-drying operation is performed in the washing cycle and the rinsing cycle as well as in the spin-drying cycle in order to remove water from the laundry. In the spin-drying operation, a motor is rotated at a high speed. As a result, centrifugal force is applied to the laundry in the drum, whereby water is removed from the laundry.

The spin-drying operation is affected by the amount of laundry and the tangling of laundry, since the motor is rotated at a high speed. As the amount of laundry increases, it is difficult to rotate the motor at a high speed. Furthermore, if the laundry is tangled and is thus collected at one side, the washing machine may be damaged due to unbalance when the motor is rotated at a high speed. Consequently, the washing machine precisely determines the amount of laundry before the execution of spin drying so as to adjust the rotational speed of the motor for spin drying based on the amount of laundry.

In a conventional washing machine, current supplied to the motor at the time of starting the motor, which is in a stationary state, is measured in order to determine the amount of laundry. If the amount of laundry is determined at the time of starting the motor, it is difficult to determine a small amount of laundry. In addition, the amount of laundry that is measured may be changed due to the initial position of laundry in a stationary state and the movement of the laundry caused by driving the motor. Particularly, as the amount of laundry increases, variation in the measured value is increased.

In addition, for a washing machine including a sensorless motor, positional alignment is difficult at the time of starting the motor, whereby variation in the measured amount of laundry is increased. If the variation in the measured amount of laundry is increased, it is not possible to determine the amount of laundry based on calculated data.

If the amount of laundry is not precisely measured, it takes a lot of time to perform the spin-drying operation, in which the motor is rotated at a high speed. As a result, the washing time increases, whereby energy consumption increases.

BRIEF DESCRIPTION OF THE DRAWINGS

The embodiments will be described in detail with reference to the following drawings in which like reference numerals refer to like elements, and wherein:

FIG. 4 is a reference view illustrating the application of force to laundry in the washing machine according to the embodiment of the present disclosure;

DETAILED DESCRIPTION

Figure 1:
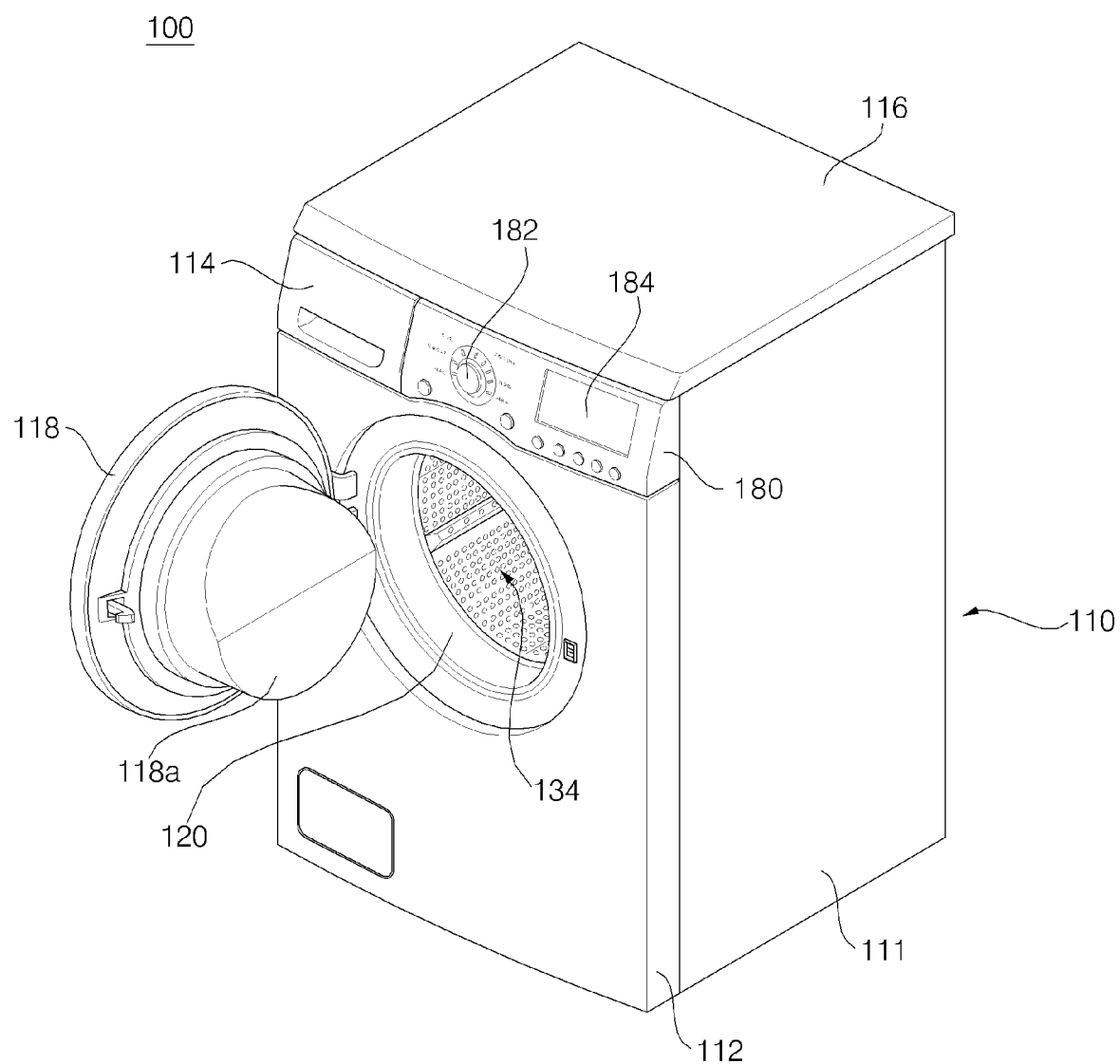
FIG. 1 is a perspective view showing a washing machine according to an embodiment of the present disclosure.
Figure 2:
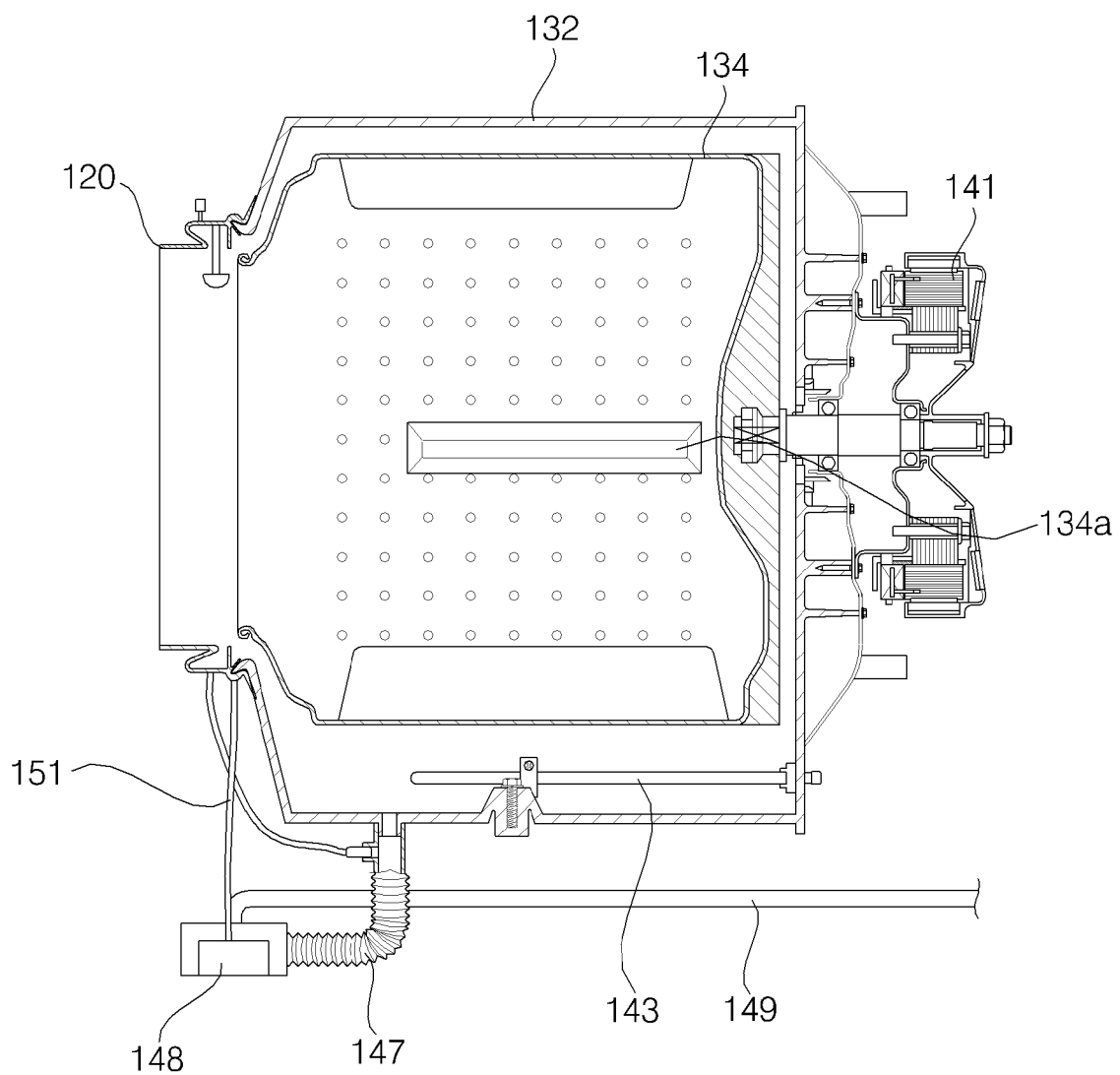
FIG. 2 is a partial sectional view of the washing machine shown in FIG. 1.

FIG. 1 is a perspective view showing a washing machine according to an embodiment of the present disclosure, and FIG. 2 is a partial sectional view of the washing machine shown in FIG. 1. A washing machine 100 according to the present disclosure is configured as shown in FIGS. 1 and 2.

A casing 110 defines the external appearance of the washing machine 100. A tub 132 for containing water is provided in the casing 110 in a suspended state, and a drum 134 for containing laundry is rotatably provided in the tub 132. A heater 143 for heating the water in the tub 132 may be further provided.

The casing 110 may include a cabinet 111 that defines the external appearance of the washing machine 100, the cabinet 111 having an open front and top, a base (not shown) for supporting the cabinet 111, a front cover 112 coupled to the front of the cabinet 111, the front cover 112 being provided with a laundry introduction hole, through which laundry is introduced, and a top cover 116 provided at the top of the cabinet 111. A door 118 for opening and closing the laundry introduction hole may be provided at the front cover 112.

The door 118 may be provided with a glass 118a such that the laundry in the drum 134 is visible from outside the washing machine 100. The glass 118a may be convex. In the state in which the door 118 is closed, the tip end of the glass 118a may protrude to the inside of the drum 134.

A detergent box 114 contains additives, such as preliminary or main washing detergent, fabric softener, and bleach. The detergent box 114 is provided in the casing 110 so as to be capable of being withdrawn therefrom. The detergent box 114 may be partitioned into a plurality of containing spaces, in which the additives are individually contained without being mixed.

In order to absorb vibration generated during the rotation of the drum 134, the tub 132 may be suspended from the top cover 116 via a spring. In addition, a damper may be further provided to support the tub 132 at the lower side thereof.

The drum 134 may be provided with a plurality of holes therein such that water flows between the tub 132 and the drum 134. One or more lifters 134a may be provided on the inner circumferential surface of the drum 134 such that laundry is lifted up and dropped during the rotation of the drum 134. The drum 134 may not be provided completely horizontally, but may be provided at a predetermined inclination such that the rear part of the drum 134 is lower than the horizontal line.

A motor for generating driving force necessary to rotate the drum 134 may be provided. The washing machine may be classified as a direct-driving-type washing machine or an indirect-driving-type washing machine depending on how the driving force generated by the motor is transmitted to the drum 134. In the direct-driving-type washing machine, a rotary shaft of the motor is directly fastened to the drum 134. The rotary shaft of the motor and the center of the drum 134 are aligned with each other on the same line. In the direct-driving-type washing machine, the drum 134 is rotated by a motor 141 provided in a space between the rear of the tub 132 and the cabinet 111.

In the indirect-driving-type washing machine, the drum 134 is rotated using a power transmission means, such as a belt or a pulley, for transmitting the driving force generated by the motor. The rotary shaft of the motor and the center of the drum 134 are not necessarily aligned with each other on the same line. The washing machine according to the present disclosure may be either a direct-driving-type washing machine or an indirect-driving-type washing machine.

A gasket 120 is provided between the casing 110 and the tub 132. The gasket 120 prevents the water contained in the tub 132 from leaking to a space between the tub 132 and the casing 110. One side of the gasket 120 is coupled to the casing 110, and the other side of the gasket 120 is coupled to the circumference of the open front of the tub 132. In addition, the gasket 120 is compressed according to the vibration of the tub 132 to absorb the vibration. The gasket 120 may be made of a deformable or flexible material that is somewhat elastic. For example, the gasket 120 may be made of natural rubber or synthetic resin.

The washing machine is connected to a hot water source H.W. for supplying hot water and a cold water source C.W. for supplying cold water via a hot water hose and a cold water hose, respectively. Water introduced via the hot water hose and the cold water hose is supplied to the detergent box 114, a steam generator, and/or a swirl nozzle under the control of a water supply unit.

A pump 148 drains water discharged from the tub 132 through a drain bellows 147 to the outside via a drain hose 149 or sends the water to a circulation hose 151. In this embodiment, the pump 148 performs both the function of a drain pump and the function of a circulation pump. Depending on the circumstances, a drain pump and a circulation pump may be provided separately.

During the rotation of the drum 134, laundry is repeatedly lifted up by the lifters 134a and dropped. When the drum is rotated at a high speed, the laundry clings to the wall of the drum. At this time, wash water is separated from the laundry by centrifugal force, and is discharged to the tub through the holes formed in the drum. In this way, spin drying is performed.

A control panel 180 may include a course selection unit 182 for allowing a user to select a course and a display unit 184 for allowing the user to input various control commands and displaying the operating state of the washing machine 100.

Figure 3:
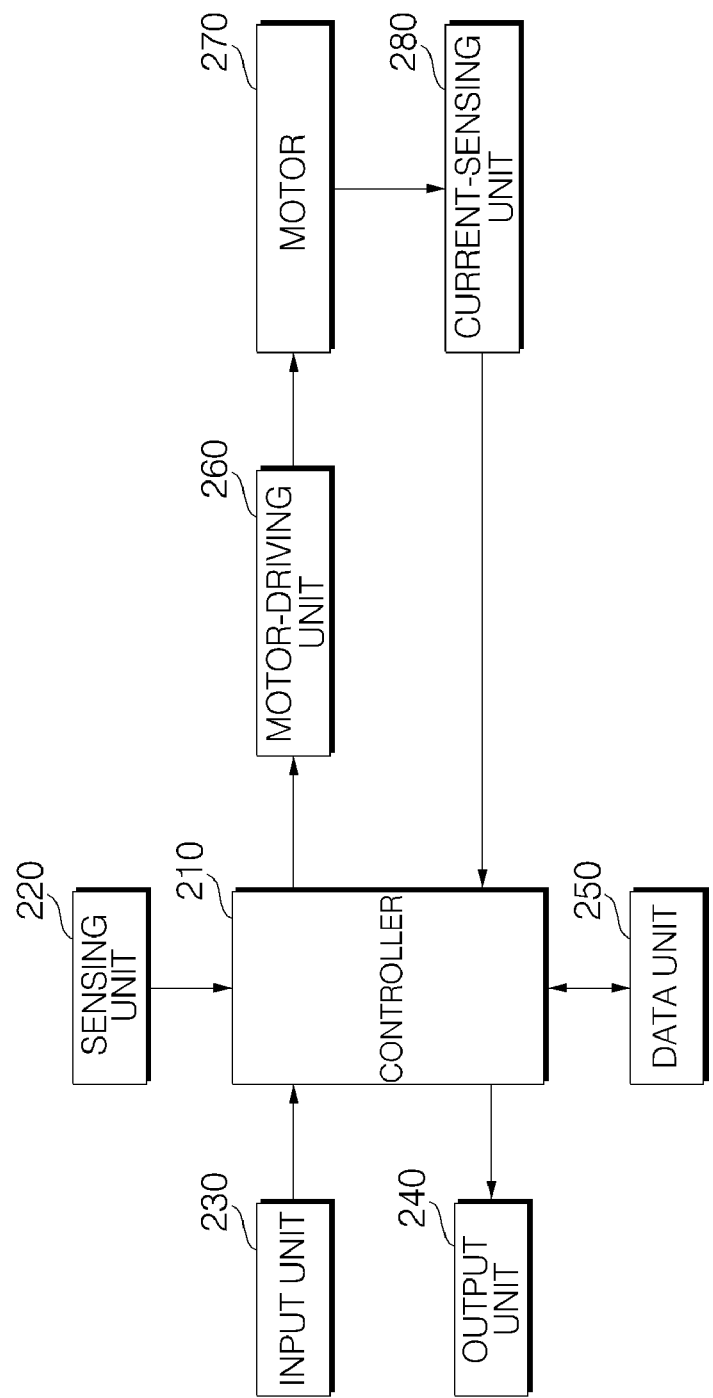
FIG. 3 is a block diagram showing a control construction of the washing machine according to an embodiment of the present disclosure.

FIG. 3 is a block diagram showing a control construction of the washing machine according to an embodiment of the present disclosure. As shown in FIG. 3, the washing machine 100 includes an input unit 230, an output unit 240, a sensing unit 220, a motor-driving unit 260, a motor 270, a current-sensing unit 280, a data unit 250, and a controller 210 for controlling the overall operation of the washing machine, in addition to the structural elements described above.

In addition, the controller 210 controls a water supply valve and a drain valve. The washing machine may further include a control construction for heating wash water. Depending on the circumstances, a communication unit for transmitting and receiving data to and from the outside may be further provided. However, a description thereof will be omitted. The controller 210 may be realized by one or more processors or a hardware device.

The input unit 230, including an input means, such as at least one button, a switch, and a touchpad, allows the user to input operation settings, such as a power on/off input, a washing course, a water level, and a temperature. When a washing course is selected through the course selection unit 182, the input unit 230 transmits data on the selected washing course to the controller.

The output unit 240 includes a display unit 184 for displaying information about the operation setting input through the input unit 230 and outputting the operating state of the washing machine. In addition, the output unit 240 further includes a speaker or a buzzer for outputting a predetermined sound effect or alarm.

The data unit 250 stores control data for controlling the operation of the washing machine, data on the input operation setting, data on the washing course, and reference data for determining whether error has occurred in the washing machine. In addition, the data unit 250 stores data that is sensed or measured by the sensing unit during the operation of the washing machine.

The data unit 250 stores various kinds of information necessary to control the washing machine. The data unit 250 may include a volatile or nonvolatile recording medium. The recording medium stores data that can be read by the microprocessor. The recording medium may include a hard disk drive (HDD), a solid-state disk (SSD), a silicon disk drive (SDD), a ROM, a RAM, a CD-ROM, a magnetic tape, a floppy disk, and an optical data storage device.

The sensing unit 220, including a plurality of sensors, measures the voltage or current of the washing machine, and senses data, such as the rotational speed of the motor, the temperature of wash water, the level of the wash water, and the pressure of the wash water that is supplied or drained, which are transmitted to the controller 210. The sensing unit 220 includes a plurality of sensors, each of which may be selected from among a current sensor (or current sensing unit) 280, a voltage sensor, a water level sensor, a temperature sensor, a pressure sensor, and a speed sensor.

The water level sensor is mounted in the drum or the tub to sense the level of wash water and transmit water level data to the controller 210. The temperature sensor measures the temperature of wash water. In addition, a plurality of temperature sensors may be provided at different positions to sense the temperature in a control circuit and the temperature of a heater for heating or drying wash water, if the heater is provided, as well as to sense the temperature of wash water. The current-sensing unit 280 measures the current that is supplied to the motor, and transmits the measured current to the controller 210. The speed sensor senses the rotational speed of the motor and transmits the sensed rotational speed of the motor to the controller. The speed sensor may be connected to the rotary shaft of the motor to sense the rotational speed of the motor based on the voltage output therefrom. Alternatively, a photoelectric sensor may be mounted to the rotary shaft of the motor to sense the rotational speed of the motor. However, the present disclosure is not limited thereto. Various other sensing means may be used.

The motor 270 is connected to the drum to generate power necessary to rotate the drum. A sensorless motor may be used as the motor 270. The motor-driving unit (or power supply) 260 supplies operating power to the motor 270. The motor-driving unit 260 controls the motor to operate or stop in response to a control command from the controller 210. In addition, the motor-driving unit 260 controls the rotational speed of the motor.

The motor-driving unit 260 controls the rotational direction, rotational angle, and rotational speed of the motor 270 in response to a control command from the controller 210. In addition, the motor-driving unit 260 controls the motor 270 to operate differently based on a predetermined washing course and on each of the washing, rinsing, and spin-drying cycles that are performed. At this time, the motor-driving unit 260 controls the rotational direction, rotational angle, and rotational speed of the motor 270 variably such that the wash water in the drum forms a specific form of water current.

The controller 210 controls water supply and drainage depending on the operation setting input through the input unit 230. In addition, the controller 210 generates a control command such that the drum is rotated to perform washing according to the operation of the motor 270, and transmits the control command to the motor-driving unit 260. The controller 210 may control a series of washing processes, such as washing, rinsing, and spin drying.

The controller 210 stores the received operation setting to the data unit 250, and outputs the operation setting or the operating state of the washing machine through the output unit 240. Depending on the circumstances, in the case in which there is a terminal that has a washing machine control application installed therein and is wirelessly connected to the washing machine, the controller may transmit data on the operation setting to the terminal.

While washing is being performed, the controller 210 determines whether the washing is being performed normally based on data received from the sensors of the sensing unit 220 and data received from the current-sensing unit 280. Upon determining that the washing is being abnormally performed, the controller 210 outputs error through the output unit 240.

For example, when the level of wash water does not reach a predetermined water level within a water supply time during the supply of water, when the level of wash water does not reach an empty water level within a predetermined drainage time while the water is being drained, when the empty water level is sensed during the execution of washing, when the temperature of wash water does not reach a predetermined temperature, or when spin drying is not performed a predetermined number of times or within a predetermined amount of time, the controller 210 determines that error has occurred.

The controller 210 transmits a control command to the motor-driving unit 260 such that a washing, rinsing, or spin-drying process is performed according to the operation setting. When the motor is operated, the controller 210 stores and analyzes a current value received from the current-sensing unit 280 to determine the state of the motor and, in addition, to determine the amount of laundry contained in the drum. In addition, the controller 210 determines deviation of laundry, i.e. the unbalance of laundry, based on the measured current.

Particularly, when washing is commenced and the drum is rotated at a high speed, the controller 210 determines the amount of laundry in the drum. Even after the controller 210 has determined the amount of laundry, the controller 210 determines the amount of laundry again before high-speed rotation of the drum when the high-speed rotation of the drum is needed such that the drum is rotated at a high speed in response to the determined amount of laundry. At this time, the controller 210 may change and set the maximum rotational speed in response to the determined amount of laundry.

When the motor is rotated by the motor-driving unit 260, the controller 210 transmits a control command to the motor-driving unit 260 such that the rotational speed of the motor increases or decreases stepwise. During the rotation of the motor, the controller 210 analyzes the current value received from the current-sensing unit 280 in an acceleration period, a maintenance period, and a deceleration period in order to determine the amount of laundry. The controller 210 calculates gravity and inertial force applied to the drum during the rotation of the motor and counter-electromotive force generated when the motor is braked to determine the amount of laundry.

FIG. 4 is a reference view illustrating the application of force to laundry in the washing machine according to the embodiment of the present disclosure. As previously described, the controller 210 determines the amount of laundry using the force applied to the drum. As shown in FIG. 4, various forces are applied to the drum, in which laundry is placed.

The washing machine separates foreign matter from the laundry and removes wash water from the laundry using the rotation of the drum. Consequently, motor torque, inertial torque, frictional torque, and load torque are applied to rotate the drum.

The motor torque is force that is applied to rotate the motor, which is connected to the drum. The inertial torque is force that impedes the rotation of the drum due to inertia, by which the existing operating state (rotation) is maintained, when the drum is accelerated or decelerated during the rotation of the drum. The frictional torque is force that impedes the rotation of the drum due to the friction between the drum and the laundry, between the door and the laundry, or between individual laundry items. The load torque is force that impedes the rotation of the drum due to the weight of laundry.

The washing machine does not determine the amount of laundry at the time of starting the motor but determines the amount of laundry during the rotation of the drum. Hereinafter, therefore, the application of force to laundry at an angle θm will be described by way of example.

As shown in FIG. 4(a), motor torque Te is force necessary at the time of operating the motor. Consequently, the motor torque Te is expressed as the sum of inertial torque, frictional torque, and load torque. The motor torque Te is the product of force necessary to lift up the laundry and the radius r of the drum.

As shown in FIG. 4(b), inertial torque Jm is applied as force that impedes the rotation of the drum due to inertia based on the distribution of the laundry in the drum when the drum is accelerated or decelerated during the rotation of the drum. At this time, the inertial torque is proportional to mass m and the square of the radius of the drum.

As shown in FIG. 4(c), frictional torque Bm is frictional force that is applied between the laundry and the tub and between the laundry and the door. Consequently, the frictional torque is proportional to rotational speed Wm. The frictional torque may be the product of the coefficient of friction and the rotational speed.

As shown in FIG. 4(d), load torque TL is gravity that is applied depending on the distribution of the laundry at the time of starting the motor. The load torque may be calculated from the weight (mass m) of the laundry, acceleration due to gravity g, the radius r of the drum, and the angle θm.

Force applied to the laundry at the angle θm is force Fg due to gravity. Since the drum is rotated, however, the force may be calculated as the product of the gravity and sin(θm). The force Fg due to gravity is decided by acceleration due to gravity, the radius of the drum, and the mass of the laundry.

During the rotation of the drum, the motor torque, the inertial torque, the frictional torque, and the load torque are applied simultaneously. These force components are reflected in the current value of the motor. Consequently, the controller 210 calculates the amount of laundry using the current value measured by the current-sensing unit during the operation of the motor.

The motor torque is greatly affected by gravity due to the weight of the laundry. When the weight of the laundry exceeds a predetermined weight, resolution is lowered. That is, if the amount of laundry exceeds a predetermined level, discrimination due to the weight of the laundry is reduced as the amount of laundry increases.

When there is friction between the laundry and the door and when the laundry is caught in the door, a change in the value of the frictional torque increases, with the result that the frictional torque is distributed. Particularly, when the amount of laundry increases, the distribution of the frictional torque greatly increases.

The value of the load torque is deviated due to the movement of the laundry. In addition, when the weight of the laundry exceeds a predetermined level, the movement of the laundry is reduced. As a result, the load torque is reduced. In contrast, the inertial torque exhibits linearity with respect to the amount (weight) of laundry, although the inertial torque is affected by the movement of the laundry. Consequently, it is possible to more precisely measure the amount of laundry.

Since the inertial torque is resting force, the inertial torque is applied at the time of acceleration or deceleration. That is, the inertial torque is applied in the acceleration period and the deceleration period. In the case in which the rotational speed is uniform, however, no inertial torque is applied, and the motor torque, the frictional torque, and the load torque are applied.

The characteristics of the inertial torque may be calculated by excluding data in the maintenance period from data in the acceleration period and the deceleration period. Inertia may be calculated by subtracting the current value in the maintenance period from the current value in the acceleration period and the current value the deceleration period, dividing the resultant value by the variation of speed per unit time, i.e. acceleration, and multiplying the resultant value by counter-electromotive force.

Consequently, the washing machine may analyze the force applied in the acceleration period, the deceleration period, and the maintenance period to determine the amount of laundry based on the inertial torque. In addition, the washing machine may calculate gravity depending on the amount of laundry in the maintenance period. In addition, the washing machine may calculate counter-electromotive force generated by braking in the deceleration period in order to calculate the amount of laundry.

In addition, since the washing machine measures the current value during the rotation of the motor in order to calculate a laundry-amount sensing value, error due to the alignment of the motor at the time of starting the motor may be eliminated. In addition, the laundry moves uniformly without the change of a load, i.e. without irregular movement of the laundry, in the maintenance period, whereby it is possible to minimize error due to the change of the load.

At this time, the washing machine differently applies laundry amount data for calculating the laundry-amount sensing value in the maintenance period and laundry amount data for calculating the laundry-amount sensing value in the acceleration and deceleration periods. In the maintenance period, the characteristics of inertia are not included. In the acceleration period and the deceleration period, inertia is applied. Consequently, the laundry-amount sensing values are calculated based on different data and compared with each other to determine the final amount of laundry.

As previously described, the controller 210 calculates the inertial torque applied during the operation of the motor to determine the amount of laundry. Consequently, the controller 210 performs control to accelerate or decelerate the motor after the rotational speed of the motor is increased to a predetermined rotational speed. The controller 210 divides the maintenance period, the acceleration period, and the deceleration period from each other based on the rotational speed of the motor, and determines the amount of laundry using current values measured in the respective periods during the operation of the motor.

The controller 210 calculates the amount of laundry using the frictional torque and the load torque, which are affected by gravity in the maintenance period, in which the motor is rotated at a low speed, accelerates the motor starting in the maintenance period such that the characteristics of the inertial torque are emphasized at a rotational speed of the motor that is higher than that in the maintenance period in order to determine the amount of laundry using inertia in the acceleration period. In addition, the controller calculates counter-electromotive force in the deceleration period in order to determine the amount of laundry. The counter-electromotive force is electromotive force that is generated by current formed from the motor in the opposite direction when the motor is braked.

The controller 210 multiplies the averages of the current values for the respective periods by counter-electromotive force to calculate the amount of laundry. The amount of laundry in the acceleration period is determined based on the laundry amount data for the inertial torque, and the amount of laundry in the maintenance period is determined based on the laundry amount data for on the gravitational torque. In addition, since the characteristics of the motor based on the kind or performance of the motor are reflected in the counter-electromotive force, the counter-electromotive force is used in calculating the amount of laundry in order to compensate therefor.

Consequently, the controller 210 may subtract the current value in the maintenance period from the current value in the acceleration period and multiply the resultant value by the counter-electromotive force to calculate the amount of laundry. Both a primary maintenance period and a secondary maintenance period are taken into consideration, and the average of the current values in the primary maintenance period and the secondary maintenance period may be subtracted from the current value in the acceleration period in order to determine the amount of laundry.

While the rotational speed of the motor is repeatedly maintained, accelerated, and decelerated, the controller 210 stores the measured current value on a per-period basis and calculates the average thereof to determine the amount of laundry.

Figure 5:
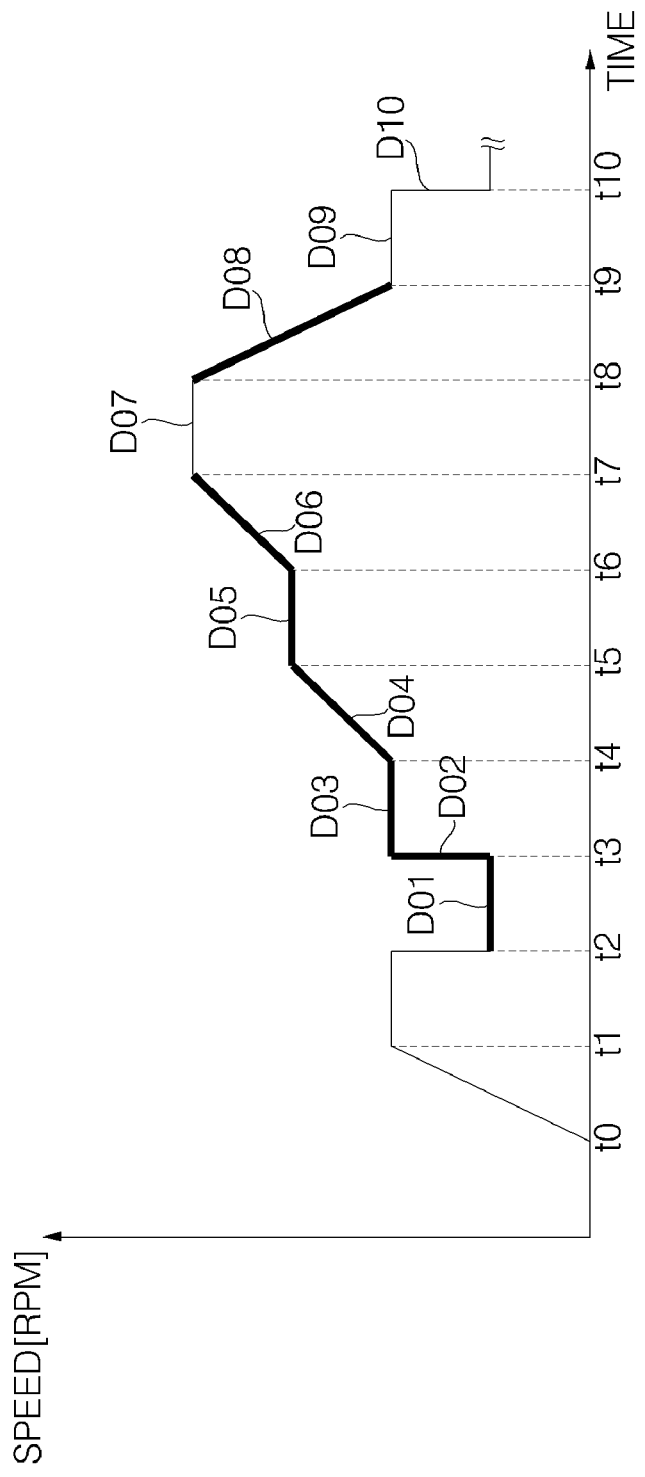
FIG. 5 is a reference view illustrating a change in the speed of a motor when the amount of laundry is measured in the washing machine according to the embodiment of the present disclosure.

FIG. 5 is a reference view illustrating a change in the speed of the motor when the amount of laundry is measured in the washing machine according to the embodiment of the present disclosure. As shown in FIG. 5, the controller 210 controls the rotational speed of the motor in order to determine the amount of laundry.

The controller 210 compares the current values in the acceleration period and the maintenance period with each other and calculates the counter-electromotive force in the deceleration period to determine the amount of laundry. In order to determine the amount of laundry, the controller 210 transmits a control command to the motor-driving unit 260 to control the rotational speed of the motor in a range from first to fourth speeds. In addition, the controller 210 generates a control command for maintaining, accelerating, and decelerating the rotational speed of the motor within the first to fourth speeds in a stepwise manner and transmits the generated control command to the motor-driving unit.

In addition, the controller 210 controls the rotational speed of the motor in a range from the first to fourth speeds, and performs control such that the rotational speed of the motor is repeatedly accelerated, maintained, and decelerated a predetermined number of times.

While the rotational speed of the motor is controlled in a range from the first to fourth speeds, the current-sensing unit 280 measures current values in periods in which the rotational speed of the motor is accelerated, maintained, and decelerated, and transmits the measured current values to the controller 210.

The controller 210 sets the rotational speed of the motor at which the motor is operated at a low speed but the drum seems to be stopped and at which the laundry is maintained at a uniform shape, unlike a stationary state, as a first speed S1, and sets the rotational speed of the motor at which the laundry tumbles in the rotating drum as a second speed S2. At the first speed, at which the motor is operated, an increase in variation of the measured value due to starting of the motor is prevented, compared to starting of the motor in a stationary state. In addition, since the motor seems to be almost stopped at the first speed, the effect due to gravity is great, and therefore it is easy to calculate gravitational torque.

The controller 210 sets the rotational speed of the motor at which centrifugal force generated in the drum by the rotation of the motor is equal to gravity and at which laundry does not cling to the wall of the drum but drops, whereby the movement of laundry is the greatest, as a third speed S3.

In addition, the controller 210 sets the rotational speed of the motor at which the laundry starts to cling to the wall of the drum due to centrifugal force generated in the drum as the rotational speed of the motor increases, at which some of the laundry rotates along with the drum in the state of clinging to the wall of the drum, and at which some of the laundry is lifted up and dropped by the rotation of the drum as a fourth speed S4.

For example, the first speed may be set to less than 30 rpm, e.g. in the range from about 20 rpm to 25 rpm, the second speed may be set in the range from 30 rpm to 40 rpm, the third speed may be set in the range from 45 rpm to 55 rpm, and the fourth speed may be set in the range from 60 rpm to 70 rpm. The first speed to the fourth speed may be changed depending on the size of the drum and the kind and performance of the motor.

In response to the control command, the motor-driving unit 260 starts the motor 270 at a zero time t0, and accelerates the motor until the rotational speed of the motor reaches the second speed S1. The motor-driving unit 260 performs control such that the motor is maintained at the second speed S2 for a predetermined amount of first to second times t1 to t2. At this time, the laundry is dispersed, since the laundry tumbles in the rotating drum while the rotational speed of the motor is maintained at the second speed.

The motor-driving unit 260 decelerates the rotational speed of the motor to the first speed S1 at the second time t2. At this time, the second speed is a low speed, and the rotational speed of the motor is decelerated to the first speed within a short time. In the figure, therefore, the rotational speed of the motor is shown as being immediately decelerated at the second time t2. In addition, the rotational speed of the motor is accelerated from the first speed to the second speed within a short time. In the figure, therefore, the rotational speed of the motor is shown as being immediately accelerated.

As previously described, the first speed is a speed at which the motor is operated but the drum seems to be stopped. That is, the first speed is lower than the minimum rotational speed that can be controlled at the time of starting the motor. Consequently, the rotational speed of the motor is accelerated to the second speed and is then decelerated to the first speed.

After the rotational speed of the motor is decelerated to the first speed S1, the motor-driving unit 260 maintains the rotational speed of the motor at the first speed S1 for an amount of time ranging from time ranging from the second time t2 to a third time t3. The current-sensing unit 280 senses the current of the motor in a first maintenance period D01 of the second time t2 to the third time t3, and transmits the sensed current of the motor to the controller.

At the first speed, the laundry does not move excessively in the drum but is maintained at a uniform shape. In addition, the drum seems to be stopped, but the motor is operated while the laundry is maintained at a uniform shape. Consequently, it is easy to calculate gravitational torque.

The motor-driving unit 260 accelerates the rotational speed of the motor to the second speed at the third time t3, and maintains the rotational speed of the motor at the second speed for an amount of time ranging from time ranging from the third time t3 to a fourth time t4.

The third time is shown as a time shorter than other acceleration periods or maintenance periods. Even though the third time is short, there exists a first acceleration period D02. The current-sensing unit 280 senses the current of the motor in the first acceleration period D02 of the third time t3, and transmits the sensed current of the motor to the controller.

In addition, the current-sensing unit 280 senses the current of the motor in a second maintenance period D03 from the third time t3 to the fourth time t4, and transmits the sensed current of the motor to the controller.

The motor-driving unit 260 accelerates the rotational speed of the motor to the third speed S3 at the fourth time t4. When the rotational speed of the motor reaches the third speed S3, the motor-driving unit 260 maintains the rotational speed of the motor at the third speed for an amount of time ranging from time ranging from a fifth time t5 to a sixth time t6.

The current-sensing unit 280 senses the current of the motor in a second acceleration period D04 from the fourth time t4 to the fifth time t5 and a third maintenance period D05 from the fifth time t5 to the sixth time t6, and transmits the sensed current of the motor to the controller.

After the lapse of a predetermined amount of time, the motor-driving unit 260 accelerates the rotational speed of the motor to the fourth speed S4 at the sixth time t6. When the rotational speed of the motor reaches the fourth speed S3 at a seventh time t7, the motor-driving unit 260 maintains the rotational speed of the motor at the fourth speed.

After the rotational speed of the motor is maintained at the fourth speed for a predetermined amount of time, the motor-driving unit 260 decelerates the rotational speed of the motor to the second speed at an eighth time t8.

The current-sensing unit 280 senses the current of the motor in a third acceleration period from the sixth time t6 to the seventh time t7, and transmits the sensed current of the motor to the controller. In addition, the current-sensing unit 280 senses the current of the motor in a deceleration period D08 from the eighth time t8 to a ninth time t9, and transmits the sensed current of the motor to the controller.

However, the current-sensing unit 280 does not measure data in a fourth maintenance period from the seventh time to the eighth time. As previously described, the current value in the maintenance period is used to calculate the amount of laundry due to the characteristics of gravity, and is also used to calculate the characteristics of inertia in the acceleration period. Since the characteristics of gravity are more evident in the low-speed maintenance period, data in the first to third maintenance periods may be used.

The motor-driving unit 260 maintains the rotational speed of the motor at the second speed for a predetermined amount of time (D09), and decelerates the rotational speed of the motor to the first speed (D10).

At this time, the motor-driving unit 260 does not immediately decelerate the rotational speed of the motor from the fourth speed to the first speed, but decelerates the rotational speed of the motor to the second speed and then to the first speed. The reason for this is that decelerating the rotational speed of the motor to the first speed and accelerating the rotational speed of the motor again is similar to restarting the motor after stopping the motor. Consequently, the rotational speed of the motor may be decelerated to the second speed, decelerated to the first speed, and accelerated in a stepwise manner.

In addition, the rotational speed of the motor is decelerated to the second speed, and is then maintained at the second speed, whereby the laundry is dispersed. Consequently, it is possible to reduce variation in the amount of laundry due to tangling of the laundry or collection of the laundry at one side.

Figure 6:
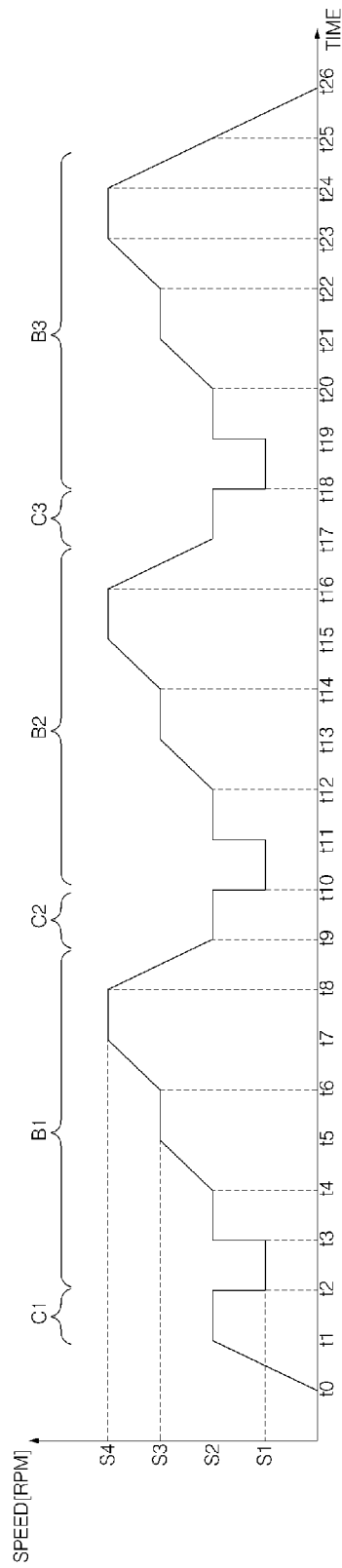
FIG. 6 is a reference view illustrating a method of sensing the amount of laundry using the change in the speed of the motor shown in FIG. 5.

FIG. 6 is a reference view illustrating a method of sensing the amount of laundry using the change in the speed of the motor shown in FIG. 5. As previously described with reference to FIG. 5, the controller 210 transmits a control command to the motor-driving unit such that laundry dispersion operations C1 to C3 and laundry-amount sensing operations B1 to B3 are repeatedly performed while the rotational speed of the motor is controlled stepwise within a range from the first speed to the fourth speed.

In response to the control command, the motor-driving unit 260 starts the motor at a zero time t0, accelerates the motor until the rotational speed of the motor reaches the second speed S2, and maintains the rotational speed of the motor at the second speed S2 for a predetermined amount of first to second times t1 to t2.

While the rotational speed of the motor is maintained at the second speed S2, the laundry tumbles in the drum due to the rotation of the drum, with the result that the laundry is dispersed, which is a first laundry dispersion operation C1.

After the laundry is dispersed, the motor-driving unit 260 performs a first laundry-amount sensing operation B1.

The motor-driving unit 260 decelerates the rotational speed of the motor to the first speed S1 at the second time t2. At this time, the second speed is a low speed, and the rotational speed of the motor is decelerated to the first speed within a short time. In the figure, therefore, the rotational speed of the motor is shown as being immediately decelerated at the second time. In addition, the rotational speed of the motor is accelerated from the first speed to the second speed within a short time. In the figure, therefore, the rotational speed of the motor is shown as being immediately accelerated.

After the rotational speed of the motor is decelerated to the first speed S1, the motor-driving unit 260 maintains the rotational speed of the motor at the first speed for an amount of time ranging from time ranging from the second time t2 to a third time t3. At the first speed, the laundry does not move excessively in the drum but is maintained at a uniform shape.

The motor-driving unit 260 accelerates the rotational speed of the motor to the second speed at the third time t3, and maintains the rotational speed of the motor at the second speed for an amount of time ranging from time ranging from the third time t3 to a fourth time t4.

The motor-driving unit 260 accelerates the rotational speed of the motor to the third speed S3 at the fourth time t4. When the rotational speed of the motor reaches the third speed, the motor-driving unit 260 maintains the rotational speed of the motor at the third speed for an amount of time ranging from time ranging from a fifth time t5 to a sixth time t6.

After the lapse of a predetermined amount of time, the motor-driving unit 260 accelerates the rotational speed of the motor to the fourth speed S4 at the sixth time t6. When the rotational speed of the motor reaches the fourth speed S3 at a seventh time t7, the motor-driving unit 260 maintains the rotational speed of the motor at the fourth speed.

After the rotational speed of the motor is maintained at the fourth speed for a predetermined amount of time, the motor-driving unit 260 decelerates the rotational speed of the motor to the second speed at an eighth time t8. When the rotational speed of the motor reaches the second speed at a ninth time t9, the motor-driving unit 260 maintains the rotational speed of the motor at the second speed until a tenth time t10. At this time, the laundry tumbles in the drum due to the rotation of the drum, whereby the laundry is dispersed (C2).

While the first laundry-amount sensing operation B1 is performed for an amount of time ranging from time ranging from the second time to the ninth time, the controller 210 receives current values in the maintenance period, the acceleration period, and the deceleration period from the current-sensing unit 280. The received data are stored in the data unit.

After performing the first laundry-amount sensing operation for the amount of time ranging from the second time to the ninth time, the controller 210 performs a laundry dispersion operation C2, as previously described, and then performs a second laundry-amount sensing operation B2 starting at a tenth time. The controller performs control such that laundry dispersion and laundry-amount sensing operations are repeated a predetermined number of times.

Consequently, the second laundry-amount sensing operation is performed for an amount of time ranging from the tenth time t10 to an eighteenth time t18, a third laundry dispersion operation is performed for an amount of time ranging from the eighteenth time t18 to a nineteenth time t19, and a third laundry-amount sensing operation is performed for an amount of time ranging from the nineteenth time t19 to a twenty-seventh time t27. Subsequently, the motor is stopped.

In the above description, the laundry-amount sensing operation has been described as being performed three times by way of example. However, the number of times the laundry-amount sensing operation is performed may be changed. In addition, the controller determines the amount of laundry without considering the unbalance of the drum, since the magnitude of vibration due to the collection of the laundry at one side during the rotation of the drum is not great.

After the laundry-amount sensing operation has been performed a predetermined number of times, the controller 210 divides the received current value into current values in the maintenance period, the acceleration period, and the deceleration period, and calculates the average of the current values and counter-electromotive force in order to determine the amount of laundry.

After determining the amount of laundry, the controller 210 controls the motor-driving unit to perform the next operation based on the determined amount of laundry. In addition, the controller 210 may set a limit value for unbalance based on the amount of laundry.

For example, the controller 210 sets the maximum spin-drying speed based on the amount of laundry, and transmits a control command to the motor-driving unit 260. As a result, the drum is rotated at the set maximum spin-drying speed to perform spin drying. Here, the spin drying includes spin drying after washing, spin drying after rinsing, and final spin drying.

Figure 7:
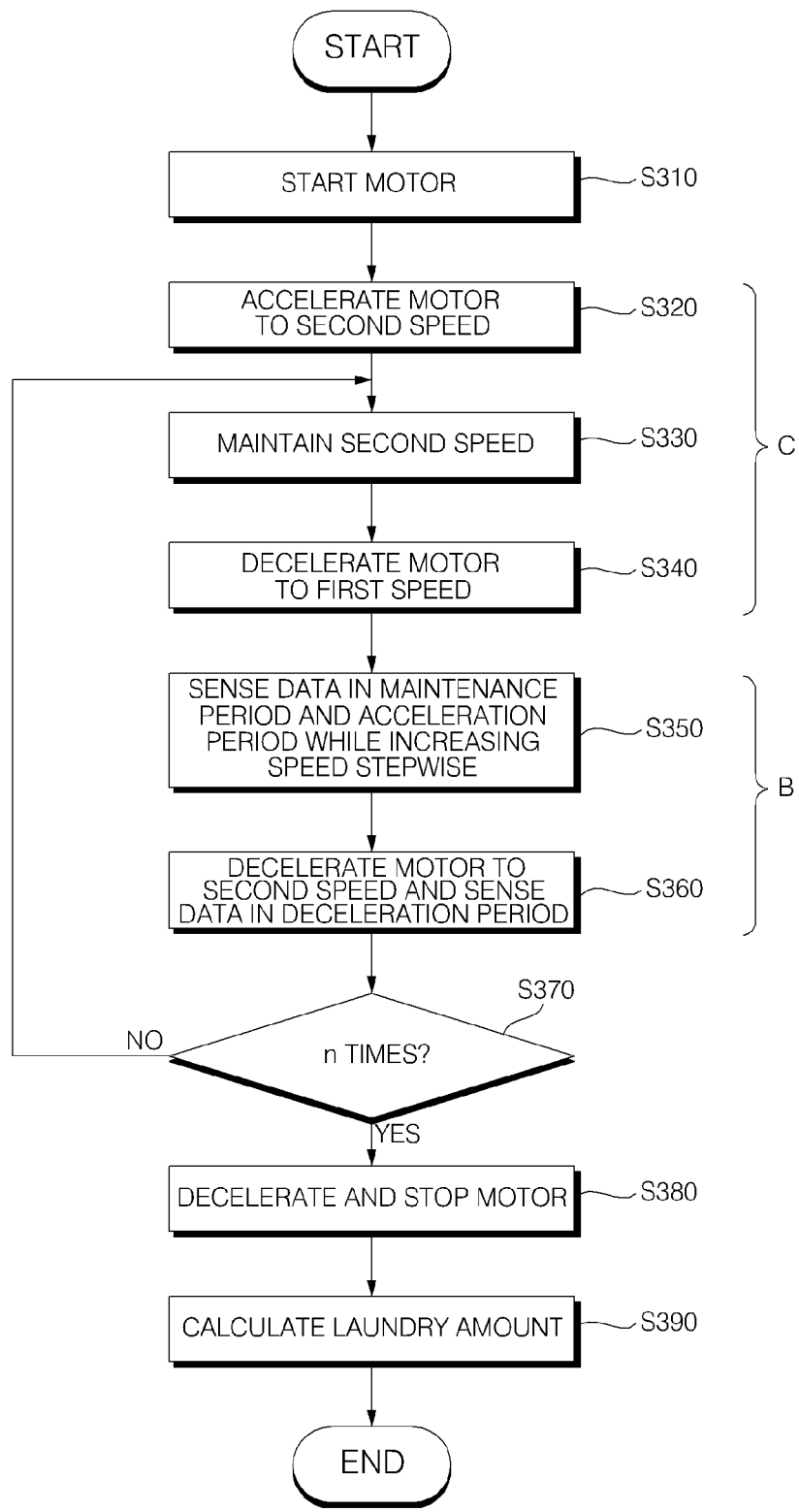
FIG. 7 is a flowchart showing a control method for measuring the amount of laundry in the washing machine according to the present disclosure.

FIG. 7 is a flowchart showing a control method for measuring the amount of laundry in the washing machine according to the present disclosure. As shown in FIG. 7, when washing is commenced, the controller 210 senses the amount of laundry before commencing high-speed spin drying. In order to sense the amount of laundry, the controller 210 transmits a control command for controlling the motor to the motor-driving unit 260.

In response to the control command from the controller 210, the motor-driving unit 260 supplies operating power to the motor 270, and the motor is driven (S310). The drum, which is connected to the motor, is rotated as the motor is driven, and laundry in the drum moves as the drum is rotated. The motor-driving unit 260 accelerates the rotational speed of the motor 270 to a second speed S2 (S320).

When the rotational speed of the motor 270 reaches the second speed S2, the motor-driving unit 260 maintains the rotational speed of the motor at the second speed for a predetermined amount of time (S330). Here, the second speed is a rotational speed at which the laundry does not cling to the wall of the drum but tumbles in the drum. As a result, the laundry is dispersed (C).

After the rotational speed of the motor is maintained at the second speed, the motor-driving unit 260 decelerates the rotational speed of the motor to a first speed S1 (S340).

In the case in which the motor is controlled starting at the first speed, the first speed may be lower than a speed for controlling the starting of the motor. Consequently, the controller accelerates the rotational speed of the motor to the second speed, and decelerates the rotational speed of the motor to the first speed.

At the first speed, gravity is strongly applied to the laundry. Consequently, the controller 210 controls the rotational speed of the motor stepwise from the first speed to the fourth speed, and measures the amount of laundry using the characteristics of gravity in the maintenance period and the characteristics of acceleration in the acceleration period. In addition, the first speed is lower than the second speed. At the first speed, the motor is rotated but the drum seems to be stopped. Since the motor is rotated at a low speed, however, the laundry is maintained at a uniform shape.

The motor-driving unit 260 performs control such that the rotational speed of the motor is accelerated stepwise from the first speed to the fourth speed after the rotational speed of the motor is maintained for a predetermined amount of time in response to the control command from the controller, and the current-sensing unit measures current in the maintenance period and the acceleration period while the rotational speed of the motor is changed and transmits the measured current to the controller (S350).

When the rotational speed of the motor is accelerated to the fourth speed and the rotational speed of the motor reaches the fourth speed, the motor-driving unit 260 brakes the motor to decelerate the rotational speed of the motor to the second speed (S330). At this time, the current-sensing unit 280 measures current in the deceleration period, and transmits the measured current to the controller.

After controlling the rotational speed of the motor stepwise in a range from the first speed to the fourth speed, the controller 21 performs control such that the motor-driving unit repeats the laundry-amount sensing operation B, in which the rotational speed of the motor is decelerated to the second speed, a predetermined number of times n.

When the predetermined number of times n has not been reached, the motor-driving unit decelerates the rotational speed of the motor to the second speed, and performs a laundry dispersion operation C (S330). After the rotational speed of the motor is decelerated to the first speed, the motor-driving unit maintains the rotational speed of the motor at the first speed or accelerates the rotational speed of the motor stepwise, and performs the laundry-amount sensing operation B (S350 and S360).

After the laundry dispersion operation C and the laundry-amount sensing operation B have been performed a predetermined number of times, the motor-driving unit 260 decelerates the rotational speed of the motor, and stops the motor (S380). While the laundry-amount sensing operation B is being performed the predetermined number of times, the controller 210 determines the amount of laundry based on the current value received through the current-sensing unit.

The controller 210 calculates averages of the data in the maintenance period, in which the rotational speed of the motor is maintained, and the data in the acceleration period, in which the rotational speed of the motor is increased, subtracts the data in the maintenance period from the data in the acceleration period to calculate the characteristics of inertia in the acceleration period, and determines the amount of laundry in consideration of the characteristics of gravity in the maintenance period. At this time, the amount of laundry based on the characteristics of inertia and the amount of laundry based on the characteristics of gravity are calculated based on different reference data. Particularly, the controller 210 multiplies the current value by counter-electromotive force in the deceleration period to calculate a laundry-amount sensing value for determining the amount of laundry. The controller 210 may compare the laundry-amount sensing value with the reference data to determine the amount of laundry.

Figure 8:
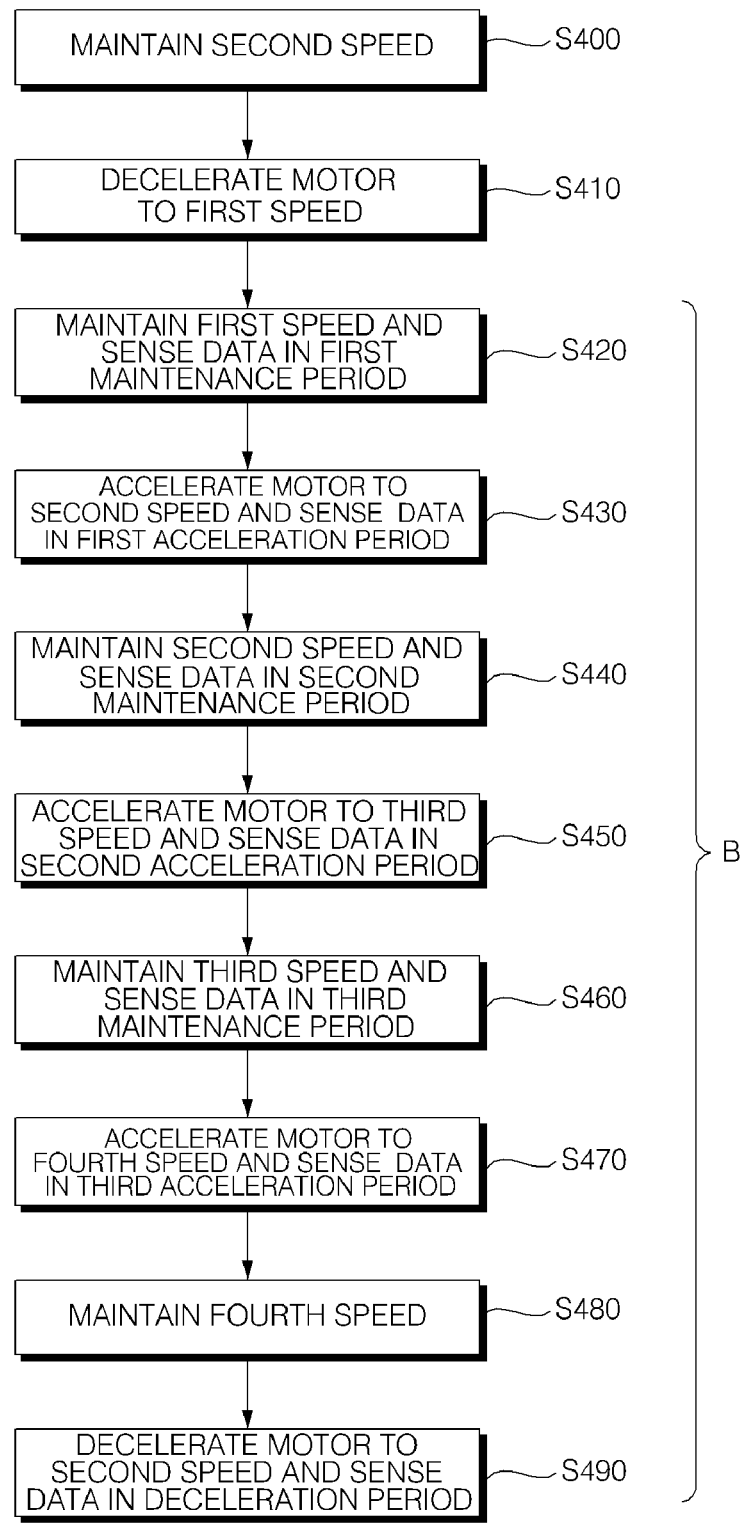
FIG. 8 is a flowchart showing a method of controlling the rotational speed of the motor when the amount of laundry is measured as shown in FIG. 7.

FIG. 8 is a flowchart showing a method of controlling the rotational speed of the motor when the amount of laundry is measured as shown in FIG. 7. As shown in FIG. 8, the rotational speed of the motor is controlled as follows while the laundry-amount sensing operation B is being performed.

After the laundry dispersion operation C, in which the rotational speed of the motor is maintained at the second speed, the motor-driving unit 260 decelerates the rotational speed of the motor to the first speed in response to the control command (S410). The reason that the rotational speed of the motor is accelerated to the second speed and is then decelerated to the first speed is that it is possible to more easily control the rotational speed of the motor, as previously described. In addition, as the rotational speed of the motor is maintained at the second speed, the laundry is dispersed, and therefore the movement of the laundry is uniform. Consequently, it is possible to reduce variation in calculating the amount of laundry.

The motor-driving unit 260 maintains the rotational speed of the motor at the first speed for a predetermined amount of time, and the current-sensing unit 280 measures the current of the motor in the first maintenance period D01 and transmits the sensed current of the motor to the controller (S420).

In addition, the motor-driving unit 260 accelerates the rotational speed of the motor from the first speed to the second speed, and the current-sensing unit 280 measures the current of the motor in the first acceleration period D02 and transmits the sensed current of the motor to the controller (S430). Here, the first acceleration period is shorter than other periods.

When the rotational speed of the motor reaches the second speed, the motor-driving unit 260 maintains the rotational speed of the motor at the second speed for a predetermined amount of time, and the current-sensing unit 280 measures the current of the motor in the second maintenance period D03 and transmits the sensed current of the motor to the controller (S440).

In addition, the motor-driving unit 260 accelerates the rotational speed of the motor from the second speed to the third speed, and the current-sensing unit 280 measures the current of the motor in the second acceleration period D04 and transmits the sensed current of the motor to the controller (S450).

When the rotational speed of the motor reaches the third speed, the motor-driving unit 260 maintains the rotational speed of the motor at the third speed for a predetermined amount of time, and the current-sensing unit 280 measures the current of the motor in the third maintenance period D05 and transmits the sensed current of the motor to the controller (S460).

In addition, the motor-driving unit 260 accelerates the rotational speed of the motor from the third speed to the fourth speed, and the current-sensing unit 280 measures the current of the motor in the third acceleration period D06 and transmits the sensed current of the motor to the controller (S470).

When the rotational speed of the motor reaches the fourth speed, the motor-driving unit 260 maintains the rotational speed of the motor at the fourth speed for a predetermined amount of time (S480). Depending on the circumstances, when the rotational speed of the motor reaches the fourth speed, the motor-driving unit 260 may not maintain the rotational speed of the motor at the fourth speed, but may decelerate the rotational speed of the motor to the second speed.

The motor is braked such that the rotational speed of the motor is reduced from the fourth speed to the second speed (S490). The current-sensing unit 280 measures the current of the motor in the deceleration period D07, and transmits the sensed current of the motor to the controller.

The controller 210 receives and stores the data in the first to third maintenance periods, the first to third acceleration periods, and the deceleration period, repeats the laundry-amount sensing operation a predetermined number of times, and calculates the averages in the respective periods and counter-electromotive force to determine the amount of laundry.

Figure 9:
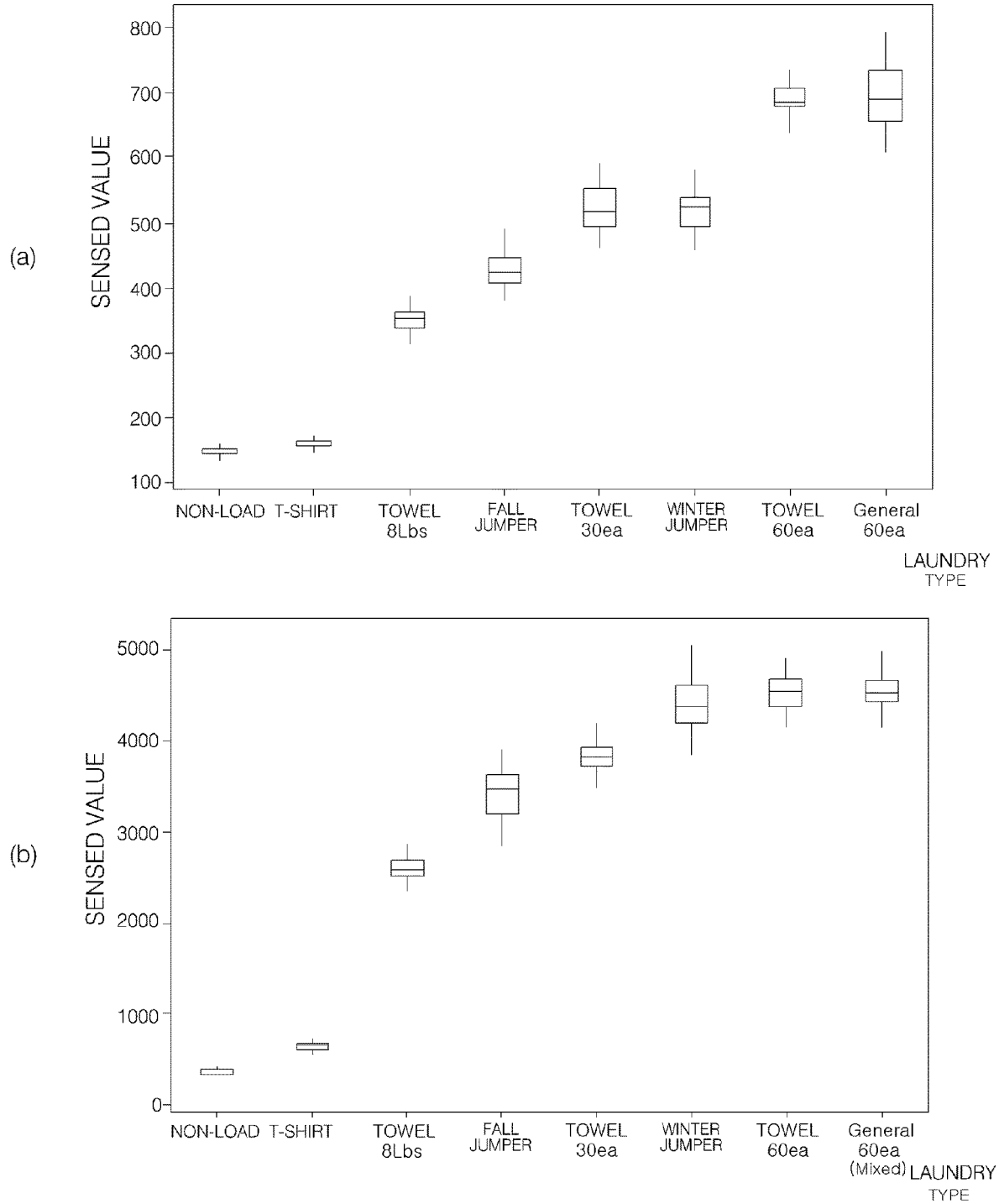
FIG. 9 is a view showing the results of measurement of the amount of laundry based on the kind of laundry in the washing machine according to the present disclosure.

FIG. 9 is a view showing the results of measurement of the amount of laundry based on the kind of laundry in the washing machine according to the present disclosure. FIG. 9(a) is a view showing laundry-amount sensing values for respective kinds of laundry according to a conventional laundry amount determination method, and FIG. 9(b) is a view showing laundry-amount sensing values for respective kinds of laundry according to a laundry amount determination method of the present disclosure.

As shown in FIG. 9(a), in the conventional washing machine, it is not possible t distinguish between an unloaded state and a T-shirt when determining the amount of laundry. In addition, the ranges of the sensed values of a fall jumper, a heavy towel, and a winter jumper overlap each other, and therefore it is difficult to distinguish therebetween. Furthermore, the distribution of the sensed values increases as the amount of laundry increases, whereby it is difficult to determine the amount of laundry.

In contrast, as shown in FIG. 9(b), in the washing machine according to the present disclosure, error depending on the characteristics of the motor is compensated for based on the current values in the maintenance period, the acceleration period, and the deceleration period, in consideration of the characteristics of the gravity and inertia, and using the counter-electromotive force, whereby it is easier to distinguish between the sensed values based on the kinds of laundry.

In the present disclosure, therefore, the current of the motor at the time of starting the motor is not measured, but the current of the rotating motor in the maintenance period, in which the rotational speed of the motor is maintained, the acceleration period, and the deceleration period, and counter-electromotive force is calculated in order to determine the amount of laundry. Consequently, it is possible to eliminate the effect of instability of current at the time of starting the motor, to minimize variation due to the movement of the laundry, and to more precisely determine the amount of laundry using the characteristics of inertia.

In addition, in the present disclosure, the rotational speed of the motor is controlled stepwise from a low speed, whereby it is possible to determine the amount of laundry without considering vibration generated due to unbalance during high-speed rotation. Furthermore, the characteristics of gravity at a low speed are used to effectively calculate the amount of laundry, and the characteristics of inertia in the acceleration period are also used, whereby it is possible to precisely determine the amount of laundry.

As is apparent from the above description, in the washing machine according to the present disclosure and the method of controlling the same, the amount of laundry that is introduced into the washing machine is measured using gravity and inertia applied during the operation of the motor, whereby it is possible to precisely calculate the amount of laundry and to minimize the effects of the initial position of the laundry and the movement of the laundry. In addition, the current value of the motor that is operated is used to measure the amount of laundry without a sensor. Furthermore, in the present disclosure, the rotational speed of the motor is controlled stepwise from a low speed, whereby it is possible to eliminate variation due to vibration. Moreover, the characteristics of gravity in the low-speed maintenance period are used to effectively calculate the amount of laundry, and the characteristics of inertia in the acceleration period are also used, whereby it is possible to precisely determine the amount of laundry. As a result, it is possible to determine the amount of laundry within a short time. Consequently, it is easy to commence the spin-drying operation, thereby reducing washing time and saving energy.

Although all components constituting an embodiment of the present disclosure have been described as being combined into a single unit and operated as the single unit, the present disclosure is not limited to this embodiment. Depending upon embodiments, the components may be selectively combined into one or more units and operated as the one or more units within the scope of the object of the present disclosure.

Therefore, the present disclosure has been made in view of the above problems, and it is an object of the present disclosure to provide a washing machine capable of rapidly and precisely determining the amount of laundry that is introduced thereinto, precisely measuring the amount of laundry even in the case in which the washing machine includes a sensorless motor, and easily performing a spin-drying operation based on the amount of laundry, thereby reducing washing time, and a method of controlling the same.

In accordance with an aspect of the present disclosure, a washing machine includes a motor connected to a drum for rotating the drum, a motor-driving unit for supplying operating power to the motor to operate or stop the motor and to control the rotational speed of the motor, a current-sensing unit for measuring current of the motor during operation of the motor, and a controller for transmitting a control command for controlling the motor to the motor-driving unit in order to determine the amount of laundry contained in the drum and determining the amount of laundry based on a current value received from the current-sensing unit, wherein the motor-driving unit controls the motor such that the rotational speed of the motor is repeatedly maintained, accelerated, and decelerated within a predetermined range of speed in response to the control command, and the controller controls the rotational speed of the motor stepwise within a range from a first speed, which is a low speed at which the laundry does not move and forms a uniform shape, to a fourth speed, at which some of the laundry clings to a wall of the drum and some of the laundry moves in the drum, and divides the current value received from the current-sensing unit into current values in a maintenance period, an acceleration period, and a deceleration period, which are divided based on rotation of the motor, and analyzes the current value on a per-period basis to calculate the amount of laundry.

In accordance with another aspect of the present disclosure, there is provided a method of controlling a washing machine that includes starting a motor in order to determine the amount of laundry contained in a drum (a starting step), dispersing the laundry (a laundry dispersion step), maintaining, accelerating, and decelerating the rotational speed of the motor within a range from a first speed, which is a low speed at which the laundry does not move and forms a uniform shape, to a fourth speed, at which some of the laundry clings to a wall of the drum and some of the laundry moves in the drum, to control the rotational speed of the motor (a laundry-amount sensing step), repeating the laundry-amount sensing step and the laundry dispersion step a predetermined number of times (a repetition step), and analyzing a current value received from the current-sensing unit on a per-period basis, the current value being divided into current values in a maintenance period, in which the rotational speed of the motor is maintained, an acceleration period, in which the rotational speed of the motor is accelerated, and a deceleration period, in which the rotational speed of the motor is decelerated, within the range from the first speed to the fourth speed, the maintenance period, the acceleration period, and the deceleration period being divided based on rotation of the motor, to calculate the amount of laundry.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A washing machine comprising:
   a motor to rotate a drum;
   a power supply to provide operating power to the motor to selectively operate the motor and to control a rotational speed of the motor;
   a current sensor to measure current of the motor during operation; and
   a controller to transmit a control command for controlling the motor to the power supply and to determine an amount of laundry contained in the drum based on the current measured by the current sensor,
   wherein:
   the power supply provides the operating power to the motor to perform a laundry-amount sensing operation at a range between a first speed and a fourth speed and to perform a laundry dispersion operation in response to the control command such that the rotational speed of the motor is increased stepwise within the range between the first speed and the fourth speed, maintained and decreased in the laundry-amount sensing operation, and the controller calculates the amount of laundry in the drum based on analyzing respective currents measured by the current sensor during a maintenance period in which the rotational speed of the motor is maintained, an acceleration period in which the rotational speed of the motor is increased, and a deceleration period in which the rotational speed of the motor is decreased, wherein, in response to the control command, the power supply provides the operating power to the motor such that:

the rotational speed of the motor is maintained at the first speed during a first maintenance period and then is increased to a second speed that is greater than the first speed, after the rotational speed of the motor reaches the second speed, the rotational speed of the motor is maintained at the second speed during a second maintenance period and then is increased to a third speed, after the rotational speed of the motor reaches the third speed, the rotational speed of the motor is maintained at the third speed during a third maintenance period and then is increased to the fourth speed, and when the rotational speed of the motor reaches the fourth speed, the motor decelerates the rotational speed of the motor to the second speed, and wherein, when the rotational speed of the motor reaches the second speed after decelerating the rotation speed of the motor, the controller performs the laundry dispersion operation at the second speed.

2. The washing machine according to claim 1, wherein, the second speed is greater than the first speed, and
the third speed is greater than the second speed and less than the fourth speed.

3. The washing machine according to claim 1, wherein the motor performs the laundry-amount sensing operation and the laundry dispersion operation a particular number of times.

4. The washing machine according to claim 1, wherein, when the rotational speed of the motor reaches the second speed, the power supply provides the operating power such that the rotational speed of the motor is maintained at the second speed for a particular amount of time to disperse the laundry.

5. The washing machine according to claim 1, wherein, when starting the motor, the power supply provides the operating power such that the motor accelerates from a stationary state to the second speed, decelerates from the second speed to the first speed, and the rotational speed of the motor then varies stepwise from the first speed.

6. The washing machine according to claim 1, wherein the controller:

sets a rotational speed of the motor at which the motor is operated at a low speed at which the laundry is maintained at a uniform shape due to low-speed rotation of the drum as the first speed, and sets a rotational speed of the motor at which the laundry tumbles in the drum as the second speed.

7. The washing machine according to claim 1, wherein the controller sets a rotational speed of the motor at which the laundry does not cling to the wall of the drum but drops as the third speed, and sets a rotational speed of the motor at which the laundry starts to cling to the wall of the drum, at which a portion of the laundry rotates along with the drum in a state of clinging to the wall of the drum, and at which another portion of the laundry is lifted up and dropped by the rotation of the drum as the fourth speed.

8. The washing machine according to claim 1, wherein the controller calculates data on characteristics of inertia based on currents measured during a first acceleration period in which the rotational speed increases from the first speed to the second speed, a second acceleration period in which the rotational speed increases from the second speed to the third speed, and a third acceleration period in which the rotational speed increases from the third speed to the fourth speed and currents measured in the first, second, and third maintenance periods, and determines the amount of laundry based on a gravitational force on the laundry that is calculated based on the currents measured during the first, second, and third maintenance periods, and a counter-electromotive force that is calculated based on current measured during a deceleration period in which the rotational speed of the motor is decreased from the fourth speed.

9. The washing machine according to claim 8, wherein the controller subtracts the currents measured during the first, second, and third maintenance periods from the currents measured during the first, second, and third acceleration periods to calculate data on characteristics of the inertia in the first, second, and third acceleration periods.

10. The washing machine according to claim 1, wherein the controller multiplies averages of the currents measured during the maintenance period, the acceleration period, and the deceleration period by a value associated with a counter-electromotive force calculated based on current measured during the deceleration period to calculate the amount of laundry.

11. The washing machine according to claim 1, wherein the motor decelerates the rotational speed of the motor from the second speed to the first speed after the laundry dispersion operation.

* * * * *